United States Patent [19]

Bussinger et al.

[11] Patent Number: 5,198,775
[45] Date of Patent: Mar. 30, 1993

[54] DEVICE FOR VERIFYING THE WATER TIGHTNESS OF METALLICALLY SHEATHED CABLE NETWORKS

[75] Inventors: Jean Bussinger, La Farlede; Yvon Jacquelin, Meounes-les-Montrieux, both of France

[73] Assignee: Societe Socrat & Belec Sarl, France

[21] Appl. No.: 601,830

[22] PCT Filed: Jul. 11, 1990

[86] PCT No.: PCT/FR90/00522
§ 371 Date: Nov. 9, 1990
§ 102(e) Date: Nov. 9, 1990

[87] PCT Pub. No.: WO91/00990
PCT Pub. Date: Jan. 24, 1991

[30] Foreign Application Priority Data

Jul. 11, 1989 [FR] France ................... 89 09565
Dec. 4, 1989 [FR] France ................... 89 16160

[51] Int. Cl.⁵ .......................................... G01N 27/00
[52] U.S. Cl. .................................. 324/544; 364/482; 324/551
[58] Field of Search .............. 324/539, 525, 540, 544, 324/541, 551, 60; 364/482; 370/13; 174/11 R; 340/605

[56] References Cited

U.S. PATENT DOCUMENTS

| | | | |
|---|---|---|---|
| 3,699,438 | 10/1972 | Webb | 324/539 |
| 4,095,174 | 6/1978 | Ishido | 174/11 R |
| 4,134,099 | 1/1979 | Lankford, Jr. | 324/539 |
| 4,277,740 | 7/1981 | Parks | 324/540 |
| 4,721,916 | 1/1988 | Hanasawa et al. | 324/551 |
| 4,866,392 | 9/1989 | Lefeldt | 324/541 |
| 4,998,069 | 3/1991 | Nguyen et al. | 324/539 |

FOREIGN PATENT DOCUMENTS

| | | | |
|---|---|---|---|
| 0197052 | 2/1978 | Fed. Rep. of Germany | 324/551 |
| 0133367 | 8/1982 | Japan | 324/551 |
| 8808967 | 11/1988 | PCT Int'l Appl. | |

OTHER PUBLICATIONS

Seisakusho, "Patent Abstracts of Japan", vol. 5, No. 126, Aug. 14, 1981, p. 75.

Primary Examiner—Jack B. Harvey
Assistant Examiner—Maura K. Regan
Attorney, Agent, or Firm—Ostrolenk, Faber, Gerb & Soffen

[57] ABSTRACT

Device for verifying the tightness of a network of cables with metal sheathing or metal part. This device comprises a central measurement unit (UC) connected to rack units (UBo1, UB2) controlling the assemblies of cables of the network (C1, C2) to which they are connected via terminal boards. The assemblies are disconnected from ground at the head of the network of the assembly of cables (C1, C2) and the insulation resistance with respect to ground of this assembly of cables is measured. The resistance is compared with an adjustable standard resistance. The electrochemical couple generated by a lack of tightness, which is associated with an alarm is also measured. The rack unit (UBo1) at the head of the network is associated with at least one rack unit (UBe1) located at the end of the cable or assembly of cables (C1) in which signals are detected and analyzed.

17 Claims, 5 Drawing Sheets

DEVICE FOR VERIFYING THE WATER TIGHTNESS OF METALLICALLY SHEATHED CABLE NETWORKS

The object of the present invention is a device for verifying the water-tightness of networks of cables having a sheathing of metal or metal wires and, in particular, of optical-fiber cables, used in telecommunication systems.

It is known that the use of optical fibers in telecommunication networks has expanded greatly during the last few years due to the substantial advantages which this material offers over the existing materials and, in particular, over coaxial cables. Optical fibers, in particular, constitute the three-directional wide band support to which leading-edge technologies have recourse and the applications of which are increasing, in particular for transmission, telebraodcasting, teleremote measurements, etc.

Optical fibers are generally contained within polyethylene cables having a metal sheathing between the cable core and the polyethylene covering. Optical-fiber cables are most frequently sheathed with aluminum or steel and referred to by the expressions "ALUPE" and "ACIEPE" respectively, these cables having a tubed or grooved-rod structure.

The proper operation of a telecommunication system is, of course, dependent on the water-tightness of the cables used, the infiltration of water resulting in the short or longer term in degradation of the cables.

In the case of optical-fiber cables, this degradation may cause extensive damage due to the slowness with which the initial degradation of the carrier cable is propagated up to the optical transmission support. It is therefore important to be able to act rapidly on a line which presents a lack of tightness, which presupposes continuous and effective verification of the system of cables so as to permit rapid detection of such a defect before the optical fibers are reached. However at present, the breakdown of a cable can be detected only when the optical fiber is damaged.

The object of the present invention is to remedy this drawback of telecommunication systems by proposing a device which permits an effective, continuous verification of the water-tightness of cables having a metallic or metal-wire sheathing, as well as supervision of the aging of these networks by verification of the condition of the metallic sheathing of said cables.

Another object of the present invention is a device which permits the rapid systematic detection of a lack of tightness in a network of telecommunication cables, this device being intended to be installed in the telecommunication center and comprising in combination:

a) means for selecting one by one the cable assemblies to be verified;

b) means for effecting the disconnecting of ground from the cable assembly which is selected;

c) means, on the one hand, for measuring the insulation resistance with respect to ground of the cables selected and comparing this resistance with a standard resistance and, on the other hand, for measuring the electrochemical couple generated by a lack of tightness;

d) alarm means which go off when a lack of tightness is detected;

e) means which make it possible, based on a computer controlled by specific software, to record, process and supply all information concerning these assemblies;

f) means which make it possible to interrogate the system from a supervisory center or in-situ.

In practice, the assemblies of cables checked can be formed by racks of the network, which are selected one by one periodically from a central measurement unit installed in the distribution center, each rack of the network being connected to a rack unit which, in its turn, is connected to the central measurement unit and contains the electrical device necessary in order to effect, upon control by the latter, the disconnecting of the corresponding rack from ground and the connecting thereof to the point of measurement.

The device in accordance with the invention thus comprises two complementary parts:

a central measurement unit which includes a system for the triggering of the measurement, a system for acquisition of the measurement information, for the processing of this information and for the giving of an alarm;

rack units arranged on each cable outlet to be tested and individually connected to the central unit, each rack unit comprising a relay which makes it possible to isolate the cables from ground in order to permit measurement of the insulation resistance of the cable.

in accordance with the first embodiment of the device in accordance with the invention, the disconnection from ground of the selected assembly of cables is effected at the head of the network by a single rack unit (UB) connected to the central measurement unit, the end of the network being isolated from ground or equipped with a surge protector.

In accordance with a second embodiment of the device in accordance with the invention, when the grounding is effected at all the ends of the network, the disconnection from ground of the selected assembly of cables is effected at the ends of the network by means of two rack units, namely an "origin" rack unit (UBo) connected to the head of the network and at least one "end" rack unit (UBe) connected to the ends of the cables, each of these rack units being connected to the cables of the network near each grounding, the "origin" rack unit (UBo) being furthermore connected to the central measurement unit.

In accordance with the invention, each network head rack unit (UBo) comprises a transmitter which, upon disconnection from ground, sends out a code in the form of frequency-modulated electric pulses between the metal sheathing and the ground so as to cause the disconnecting of the groundings of the cable or of the assembly of cables concerned, the "end" rack unit or units (UBe) effecting this disconnecting as soon as they identify the code.

For this purpose, each "origin" rack unit (UBo) of the device in accordance with the invention comprises a binary code generator associated with an FSK modulator, the assembly generating the transmission of frequency-modulated electric pulses.

For this purpose also, each "end" rack unit (UBe) has a low resistance connected in series with ground over which the signal emitted arrives, the signal being analyzed by a decoder associated with an FSK receiver connected in series with said resistance, said decoder, when it identifies the appropriate code, sending a signal to a relay control which immediately effects the disconnecting of the cable or assembly of cables from the ground.

The relay control is preferably supplemented by a timer the function of which is to permit the control to act only for the time of the measurement, for instance for about one minute.

In accordance with the invention, once the disconnection from ground has been effected, the measurement of the resistance of the selected bay is effected by applying a low voltage giving a first value of the voltage at the measurement point. A changeover switch which makes it possible to change the sign of the voltage leads to a second value of the voltage at the measurement point, the two measured values permitting the evaluation, on the one hand, of the insulation resistance of the rack unit with respect to ground and, on the other hand, of the electrochemical couple, manifested by the dissymmetry of charge upon the reversal of polarity. These two values are compared with adjustable reference thresholds, an exceeding of said thresholds causing the triggering of an alarm which indicates the presence of a lack of tightness in the rack unit selected.

The triggering of the alarm can be visualized at the level of the rack unit concerned by the lighting up of an alarm light, a selection light possibly furthermore indicating its selection by the central measurement unit.

The device in accordance with the invention may suitably comprise two consecutive alarms of different type actuated after repetition of the measurements at the end of a period of time of about 5 to 10 minutes if each of the second and third measurements detects a fault.

The signaling of the alarms can be effected by the giving off of a preliminary alarm after measurement of the dissymmetry of load and/or by the giving off of an alarm after measurement of the insulation resistance.

The preliminary alarm may take the form of a yellow light on the central unit and a red light on the rack unit concerned, while the alarm may take the form of two red lights which are lit up both on the central unit and on the rack unit.

The central measurement unit of the device in accordance with the invention may suitably comprise a series connection with a terminal which permits the reading of the measurements recorded in-situ or remotely, as well as the synchronization of the measurement cycle with a clock.

In accordance with a preferred embodiment, the terminal is associated with a means such as a modem which permits transmitting information remotely over telephone lines so as to permit remote interrogation of any central unit. Such a modem may consist, for instance, of a mini-tel or a computer.

Other characteristics and advantages of the present invention will become evident from the detailed description given below of one of its embodiments, illustrated in the accompanying drawing, it being understood that this description is not limitative of the invention.

Figure 1:
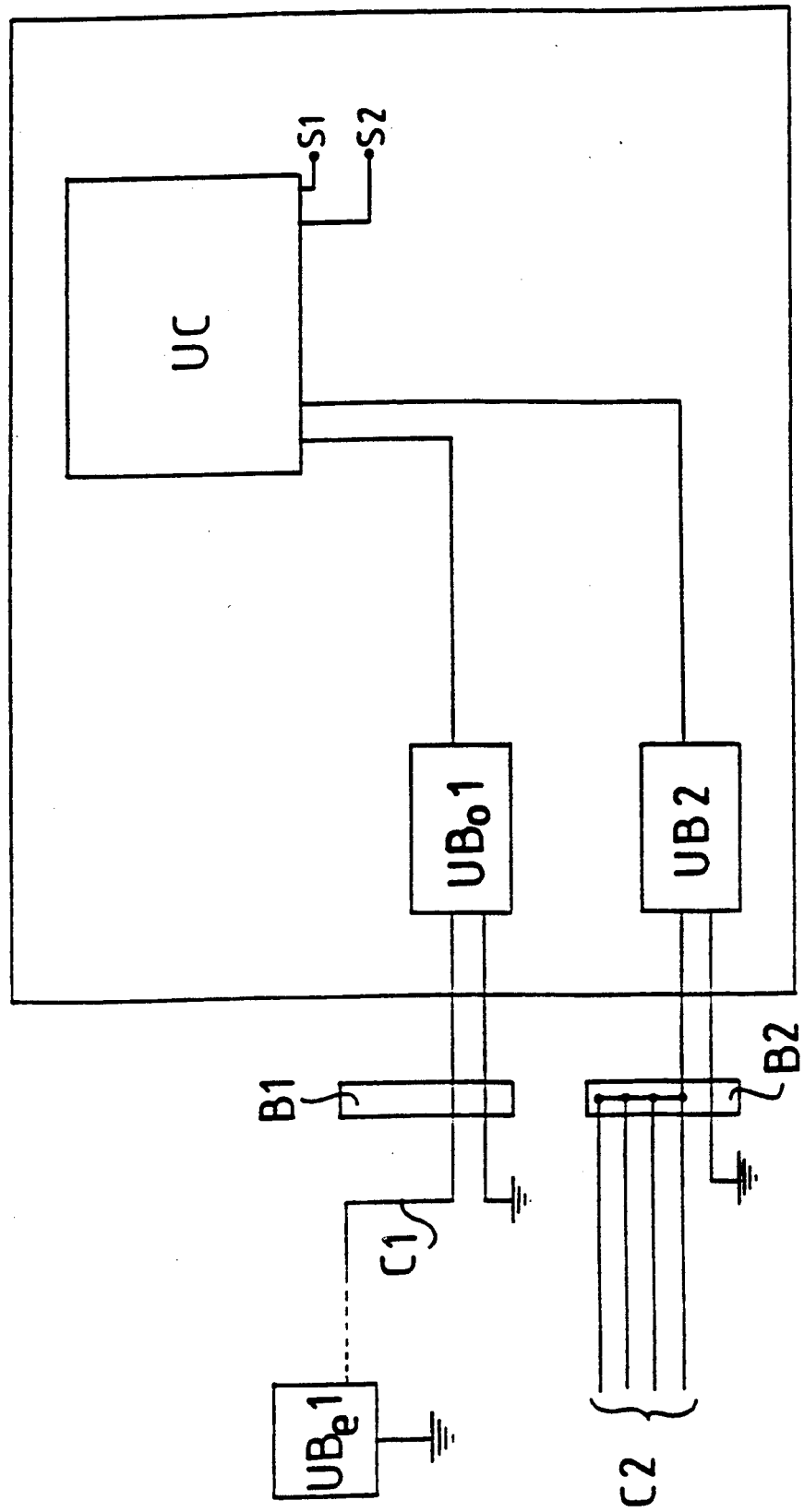
FIG. 1 shows diagrammatically the two embodiments of a control device in accordance with the invention.

Referring first of all to FIG. 1, it is seen that the control device in accordance with the invention comprises a central measurement unit UC connected electrically to a number of rack units, including the rack units UBo1 and UB2 which are connected via terminal boards B1 and B2 respectively on the one hand to ground and on the other hand to the metal parts of a number of cables $C_1$ and $C_2$ respectively.

The rack unit UBo1 is furthermore associated, at the end of the cable or assembly of cables $C_1$ which it monitors, with a rack unit UBe1. The central unit UC furthermore comprises two outlets, one S1 leading to the alarm devices and the other S2 serving for the feeding thereof with direct current.

Figure 2:
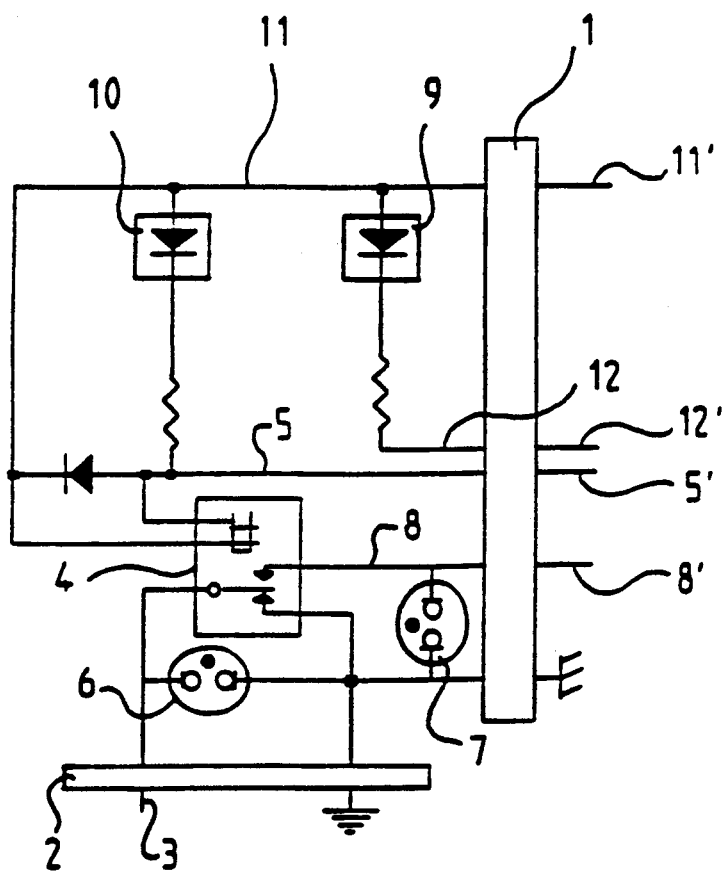
FIG. 2 is a block diagram of a rack unit of the device of FIG. 1.

If one now refers to FIG. 2, it is seen that each rack unit comprises a terminal board 1 connecting it to the central measurement unit and a terminal board 2 connecting it, on the one hand, to ground and on the other hand, to the cables which are combined at a point 3.

A relay 4 which is connected via connections 5 and 5' to the measurement unit makes it possible, upon command of the latter, to disconnect the cables of point 3 from the ground, two dischargers 6 and 7 arranged upstream and downstream of the relay 4 serving for the protection of the device from possible overvoltage.

The common point 3 of the cables, which is normally connected to ground, is then linked via the connections 8 and 8' to the measurement point located in the central unit. The measurement of the insulation resistance of the cables 3 is effected and compared with a standard resistance taken as alarm threshold.

In the event that said resistance is exceeded, an alarm device 9 is triggered from the central unit through the connections 12 and 12', causing the lighting up of a red light on the front of the rack unit. Furthermore, a white or green light can light up on its front, signaling its selection by the central unit, as soon as the latter controls the relay 4, due to an alarm device 10 placed between the electrical connection 5 and the connections 11 and 11' for the feeding of the rack unit with direct current.

Figure 3:
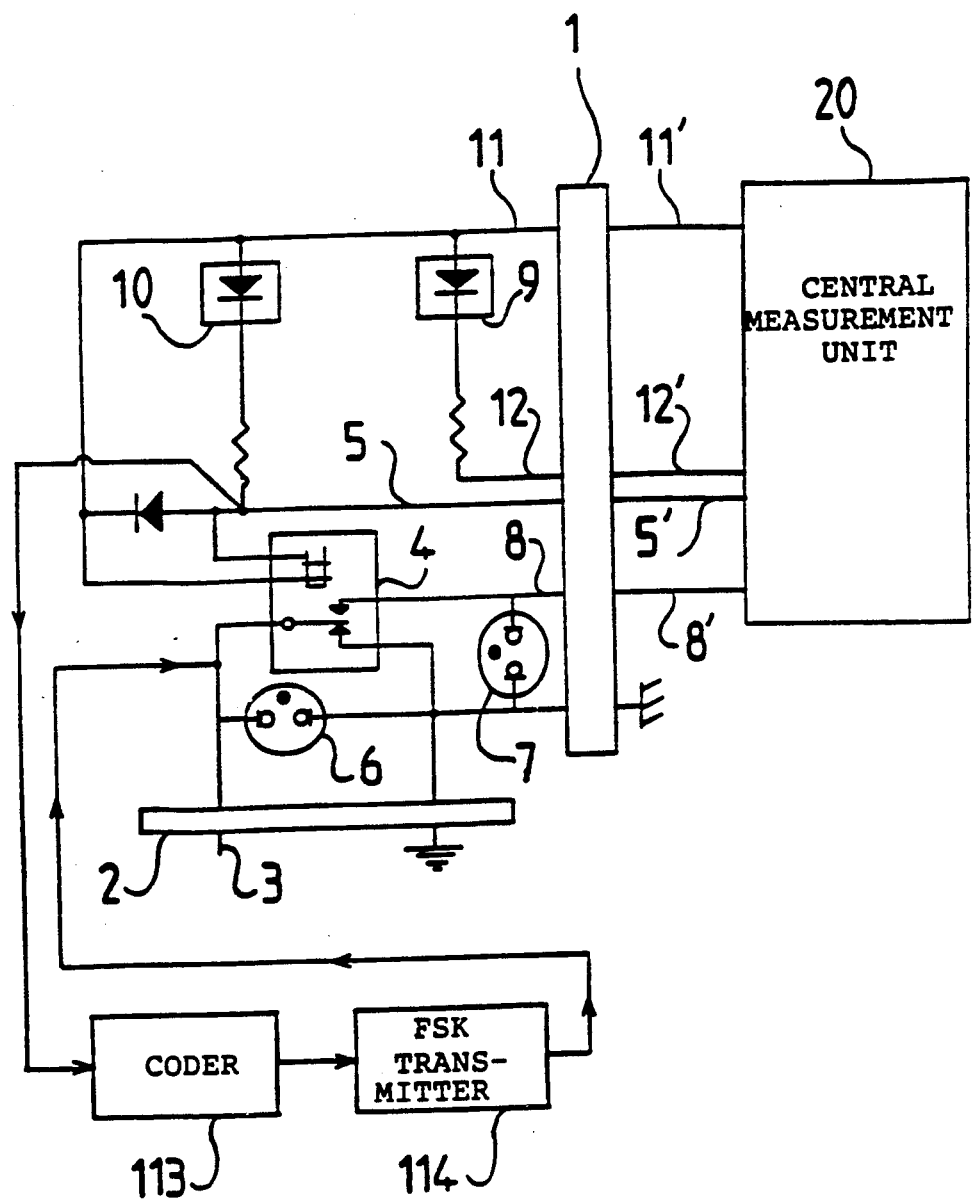
FIG. 3 is a block diagram of a network origin rack unit, UBo, of one of the embodiments of the device in accordance with the invention.

Referring now to FIG. 3, it is seen that the "origin" rack unit comprises a terminal board 1 which connects it to the central measurement unit 20 and a terminal board 2 which connects it, on the one hand, to ground and, on the other hand, to the cables combined at a point 3.

A relay 4, connected via electrical connections 5 and 5' to the measurement unit makes it possible, upon command from the latter, to disconnect the cables of the point 3 from ground, two dischargers 6 and 7 arranged on opposite sides of the relay 4 serving to protect the device against possible overvoltage.

The common point 3 of the cables, which is normally connected to ground, is then linked, via the connections 8 and 8', to the measurement point located in the central unit, permitting the measurement of the insulation resistance of the cables 3, which is compared in the central measurement unit with a predetermined resistance taken as alarm threshold.

In case the latter is exceeded, an alarm device 9 is activated from the central unit over the connections 12 and 12' causing the illuminating of a light, for instance, a red light, on the front of the rack unit.

Furthermore, a light of another color, for instance white or green, can light up on its front, indicating its selection by the central unit as soon as the latter controls the relay 4, due to a signaling device 10 connected between the connection 5 and the connections 11 and 11' which feed a direct current to the rack unit UBo.

Parallel to the illuminating of this signal light, the selection of the rack unit UBo by the central measurement unit activates the operation of a transmitter which is connected to it via electrical connections 5-5' and which is formed of a binary code generator 113 associated with an FSK modulator 114 which is mounted between the said generator 113 and the relay 4, causing the emission of modulated pulses between the ground and the metal sheathing of the cables of the rack.

Figure 4:
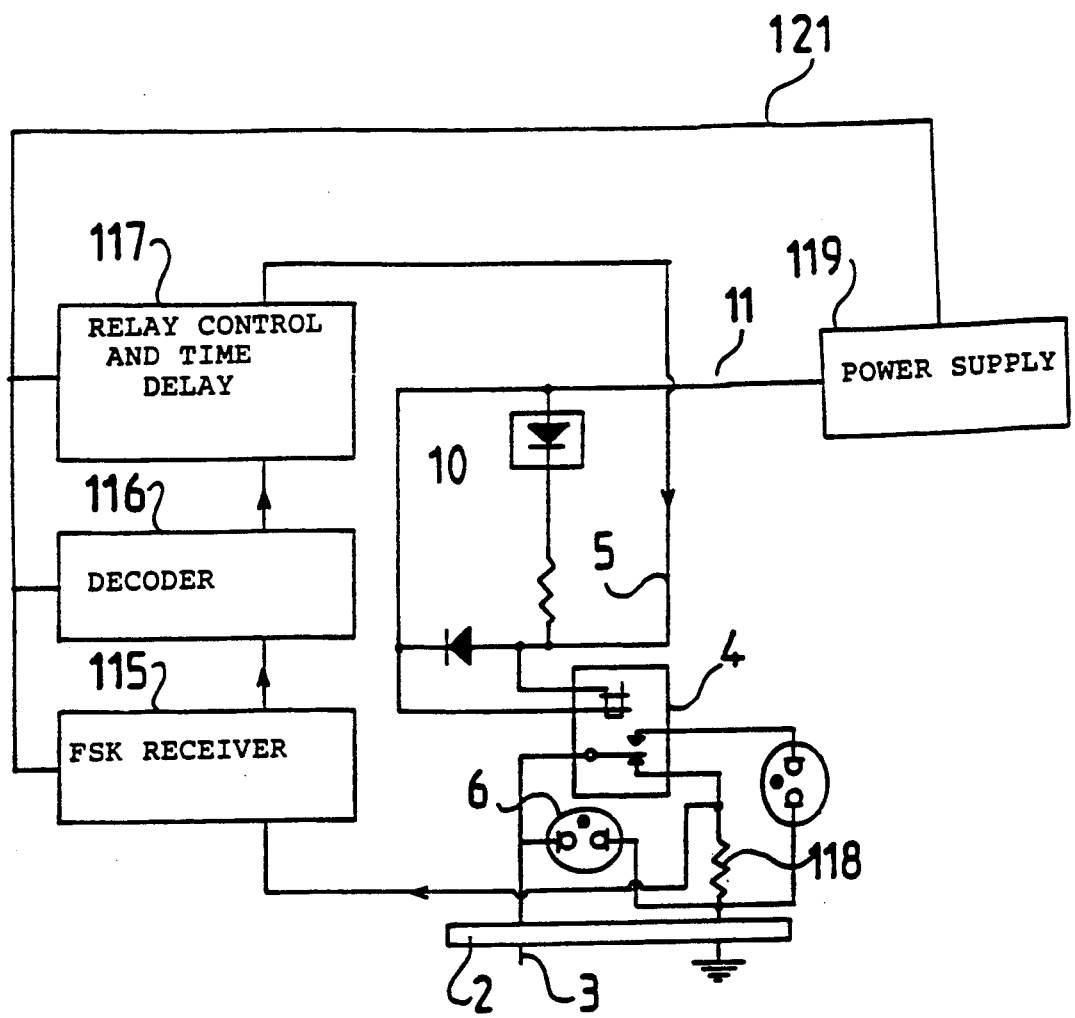
FIG. 4 is a block diagram of a network end rack unit, UBe, of this same embodiment.

If one now refers to FIG. 4, it is seen that the "end" rack unit comprises, in addition to a terminal board 2 connecting it on the one hand to ground and on the other hand to the cables combined at a point 3, also a relay 4, two dischargers 6 and 7 arranged on opposite sides of the relay 4, and a signaling device 10.

However, in this case the relay 4 is connected by a connection 5 to a relay control 117 which is connected to a decoder 116 and an FSK receiver 115 which is furthermore connected to a resistor 118 which is connected in series with ground and which receives the signal emitted by the transmitter of the rack unit UBo.

The FSK receiver 15 picks up this signal, which the decoder 16 analyzes. If the latter recognizes the appropriate code in the signal, it sends a signal to the relay control 117, which then activates the relay 4, causing the disconnecting of the cable from ground. A timer completes the control of relay 4 so that the disconnect command acts only for the measurement time, namely about one minute. Parallel to this, the signaling 10 is brought about and remains in operation for the measurement time.

The feeding of each rack unit UBe is effected locally by a feed source of power 119 which, via connections 11 and 121, provides the electrical energy intended to feed all of the internal circuits which it comprises, namely, the relay 4, the signaling 10, the receiver 115, the decoder 116 and the relay control 117.

The resistor 118 which makes it possible to detect the signal from the transmitter of the rack unit UBo, is a low resistor having a resistance on the order of a few tenths of an ohm.

This second embodiment of the device in accordance with the invention, by making it possible to effect the complete disconnecting from ground of the cables of a telecommunications network, permits supervision of the tightness of all the cable networks, provided that they have a metal sheathing or metal wires, and, in particular, supervision of long-distance networks, which constitutes substantial progress as compared with the existing techniques.

Figure 5:
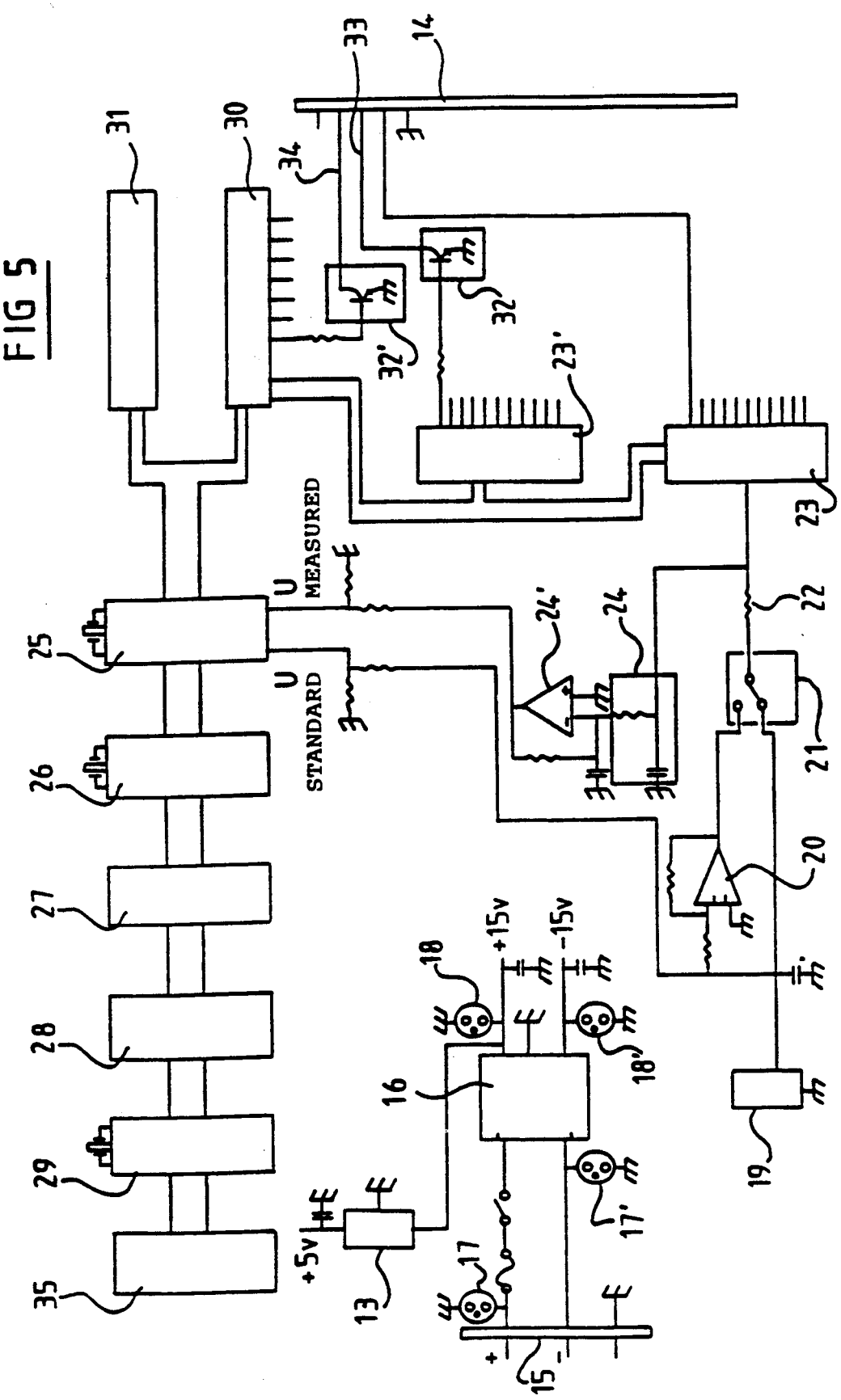
FIG. 5 is a block diagram of the central measurement unit of a device in accordance with the invention.

Referring now to FIG. 5 it is seen that the central measurement unit of the device in accordance with the invention comprises an outlet terminal board 14 towards the rack units and a terminal board 15 for the supply of direct current. Its feed circuit comprises a galvanically isolated DC/DC converter 16, which transforms the 48 volt general direct feed voltage into two direct voltages +15 V and −15 V intended to feed its analog part. The inputs and outputs of the converters are provided with dischargers 17 and 17' and 18 and 18' respectively which protect the central unit and the 48 V feed network from possible overvoltages, while the +15 V output is connected to a 5 V regulator 13 feeding the circuits of the digital part.

In the analog part of the central unit, a 10 V voltage generator 19 followed by an amplifier 20 delivers the two standard measurement voltages +10 V and −10 V, an analog changeover switch 21 making it possible to select one or the other. The switch 21 is followed by a standard resistor 22 and an analog multiplexer 23 permitting connection to the selected rack unit.

Once the connection is established, the measurement signal passes through the filter 24 and then a follow-up 24' of high-impedance input which eliminates parasitic currents, and it reaches an analog-digital converter 25 which makes the signal suitable for use by the digital part of the central unit.

The digital part of the central unit comprises a microprocessor 26 which processes the digital data, a memory 27 (RAM) which stores the data necessary for the software as well as the measurements effected, a memory 28 (EPROM) which is erasable by UV and contains the control software for the device, as well as a clock 29 which synchronizes the device, said clock 29 being furthermore connected to a modem 35. It furthermore comprises two peripherals 30 and 31 (PIA) controlling the inputs-outputs.

The peripheral 30 (PIA) manages the analog multiplexer 23 as well as a digital multiplexer 23' controlling the relays of the rack units over connections 33 and the outputs of which are buffered by transistors 32 connected as open collector, intended to increase their power. It furthermore manages the alarm lights of the rack units over connections 34, its outputs being also buffered by transistors 32' connected as open collector.

The peripheral 31 (PIA2) manages the alarm and operating/stop lights of the central unit, the selection of the rack unit and the voltage reference thresholds, as well as the rezeroing button.

The digital part of the central unit comprises, furthermore, a battery connected to a voltage-drop detection circuit; if the feed voltage drops, the clock 29 and the memory 27 are fed by the battery, which assures the synchronization of the system and the protection of the data stored in the memory 27.

A demultiplexer circuit for the data used by the microprocessor 26 as well as a programmable circuit formed of logical gates producing the logic necessary for the system supplement the digital part of the central unit.

The operation of the device in accordance with the invention is as follows: each of the rack units is tested cyclically in accordance with a sequence defined by software stored in the erasable memory 28, the synchronization of the sequence being assured by the clock 29 and its execution by the microprocessor 26.

The rack unit (for example, UB2) being selected, the microprocessor 26, via its bus sends the order to flip the relay of UB1. This order is transferred by the peripheral 30 (PIA1) to the digital multiplexer 23', which directs the order towards the UB, the corresponding rack being immediately disconnected from ground.

The microprocessor 26 then, still via the bus and the peripheral 30 (PIA1), sends the analog multiplexer 23 the order to place the measurement point on UB1.

The measurement signal, after having passed through the filter 24 and the follow-up 24', is digitalized by the analog-digital converter 25, as well as the standard voltage. These two digital values permit the calculation of the insulation resistance of the UB2, the value of which is compared with the selected reference threshold.

The verification of the electrochemical couple is effected in the same manner after change of the sign of the standard voltage, and the values obtained are compared with the previous ones.

Depending on the result of the comparison, an alarm can be triggered: the microprocessor 26 then gives the order, via the peripheral 31, to flip the relay of the alarm light of UC, which lights up. The same order sent to UB2 via the peripheral 30 (PIA1) and the digital multiplexer 23' causes the illumination of the alarm light on the UB1.

The measured data are stored in the memory 27 (RAM) upon command of the microprocessor 26, which makes it possible to observe the aging of the cable.

The device in accordance with the invention has the advantage, which has already been mentioned, of permitting the effective verification in time of the watertightness of a network of cables, particularly a network of optical fiber cables. The detection of an abnormality on a rack unit makes it possible to locate the defective cable, permitting rapid repair, without affecting the operation of the network.

Of course, the present invention is not limited to the foregoing description of two of its embodiments, which may be subjected to a number of modifications without thereby going beyond the scope of the invention.

In particular, the recording of the measurements can be effected in such a manner as to provide useful information concerning the aging of the network as a function of time and changes in weather, making it possible to establish a preventive maintenance plan for the networks and effect a levelling out of the cost of the work, while improving the reliability of the networks. This results in a substantial decrease in the operating cost of the networks.

We claim:

1. A device for verifying the tightness of a plurality of cable assemblies forming a network of cables with a sheathing of metal or a metal part normally connected to ground, comprising:
   (a) means for selecting, one by one, the assemblies of cables forming the networks;
   (b) means for disconnecting the sheathing of the selected assembly of cables from ground;
   (c) means for measuring the insulation resistance of the sheathing of this assembly of cables with respect to ground;
   (d) means for comparing said resistance with a predetermined resistance;
   (e) means for measuring the electrochemical couple generated by a lack of tightness;
   (f) alarm means which go off when a lack of tightness has occurred;
   (g) means for recording, processing and supplying all information concerning the said assemblies of cables; and
   (h) means for interrogating the system remotely or in-situ.

2. A device according to claim 1, characterized by the fact that the means for measuring the resistance of the selected cables and the means for measuring the electrochemical couple comprise a means for successively applying to the measurement point two direct standard voltages equal in absolute value but of opposite sign, respectively permitting the measurement of the insulation resistance of the cables with respect to ground and the electrochemical couple generated by a lack of tightness.

3. A device according to claim 2, characterized by the fact that the central control unit comprises, in combination:
   a feed circuit which makes it possible to generate the opposite standard voltages serving for the measurement;
   a circuit for the generating of reference threshold voltages;
   a system for the starting of the measurement;
   a system for the acquisition of measurement data and the processing of said data;
   an alarm system.

4. A device according to claim 3, characterized by the fact that the feed circuit of the central unit comprises a DC/DC converter for transforming a 48 V general feed voltage into two direct voltages of +15 V and −15 V.

5. A device according to claim 3, characterized by the fact that the system for the triggering of the measurement of the central unit comprises a microprocessor connected to a peripheral, which in its turn is connected on the one hand to a digital multiplexer which directs the order to flip the corresponding relay (4) to the selected rack unit and, on the other hand, to an analog multiplexer which places the measurement point on the same rack unit, the microprocessor assuring the execution of a sequence defined by software recorded in an erasable memory and the synchronizing of the sequence being effected by a clock.

6. A device according to claim 3, characterized by the fact that the circuit for the generation of the reference threshold voltages comprises a 10 V voltage generator for generating +10 V and −10 V reference voltages followed by an amplifier, an analog changeover switch for selecting one or the other of the two +10 V and −10 V reference voltages delivered, and an analog multiplexer for connecting the selected reference voltage with the selected rack unit.

7. A device according to claim 3, characterized by the fact that the measurement-data acquisition and processing system comprises an analog-digital converter which receives the measurement signal and the reference voltage, and sends the corresponding digital data to the microprocessor which establishes a comparison thereof and, if necessary, gives the order, via a peripheral, to trigger the alarms both in the selected rack unit and in the central unit.

8. A device according to claim 3, characterized by the fact that the alarm system comprises lights which illuminate on the central measurement unit as well as on the rack unit concerned, with automatic return of the alarm towards a supervisory center.

9. A device according to claim 3, characterized by the fact that the central control unit comprises a computer controlled by specific software and provided with means enabling data to be transmitted remotely.

10. A device according to claim 9, characterized by the fact that the means permitting the transmission of the data remotely consists of a modem.

11. A device for verifying the tightness of a plurality of cable assemblies forming a network of cables having a sheathing of metal or a metal part normally connected to ground, which comprises:
   (a) a plurality of rack units, at least one for each cable assembly having means for selectively disconnecting the sheathing of a cable assembly to be measured from ground;

(b) a central control unit connected to the rack units and comprising:

(c) means for selecting a cable assembly to be measured; and (d) means for measuring the insulation resistance with respect to ground of the sheathing of the selected assembly of cables, for comparing the measured resistance with a predetermined resistance and for measuring the electrochemical couple of the selected assembly of cables.

12. A device according to claim 11 characterized by the fact that each rack unit comprises a relay for it disconnecting the selected rack from ground at the head of the network and connecting it with the measurement means, and an alarm system which permits the illuminating of a light on its front when a lack of tightness has occurred.

13. A device according to claim 11, characterized by the fact that, for each cable or assembly of cables to be checked, the rack units comprise a head rack unit, the head rack unit comprising means for giving off a signal forwarded by the sheath or the metal part of the cable towards the end rack unit, the end rack unit comprising means for detecting and analyzing said signal as well as means for controlling and effecting the disconnecting of the cable or assembly of cables concerned from ground.

14. A device according to claim 13, characterized by the fact that the head rack unit comprises a signal transmitter consisting of a binary code generator associated with an FSK modulator connected in parallel with the relay, the signals emitted by said code generator and said modulator being propagated along the metal sheath or part of the assembly of cables up to the end rack unit.

15. A device according to claim 13, characterized by the fact that the end rack unit comprises a low valued resistor connected in series with ground and an FSK receiver associated with a decoder and a relay control connected to the relay associated with the end rack unit, the end rack unit being fed locally with electrical energy from a source of power.

16. A device according to claim 15, characterized by the fact that the low value resistor has a resistance of a few tenths of an ohm.

17. A device according to claim 15, characterized by the fact that the relay control is supplemented by a timer which limits the disconnection control to the time necessary for the measurement.

* * * * *